United States Patent [19]
Onuma et al.

[11] Patent Number: 5,628,449
[45] Date of Patent: May 13, 1997

[54] METHOD OF WELDING A CARBON STEEL AND AN AUSTENITIC STAINLESS STEEL TOGETHER AND RESULTANT STRUCTURE

[75] Inventors: Tsutomu Onuma, Hitachi; Toshimi Matsumoto, Hitachinaka; Masami Yada; Koji Goto, both of Hitachi; Osamu Matsushima, Hitachioota; Hideo Suzuki, Takahagi; Tatsuo Yonezawa; Masaki Murashita, both of Hitachi, all of Japan

[73] Assignee: Hitachi, Ltd., Tokyo, Japan

[21] Appl. No.: 480,396

[22] Filed: Jun. 7, 1995

[30] Foreign Application Priority Data

Jun. 15, 1994 [JP] Japan ................ 6-132770

[51] Int. Cl.$^6$ .................. B23K 15/00; B23K 26/00
[52] U.S. Cl. .................. 228/262.41; 228/184; 228/219; 219/121.64
[58] Field of Search .................. 228/262.41, 225, 228/184, 219; 219/121.14, 121.46, 121.64; 29/889.21

[56] References Cited

FOREIGN PATENT DOCUMENTS

| | | | |
|---|---|---|---|
| 35135 | 3/1977 | Japan | 228/262.41 |
| 100891 | 8/1980 | Japan | 228/262.41 |
| 70390 | 3/1990 | Japan | 228/262.41 |
| 670 | 1/1994 | Japan | 228/262.41 |

OTHER PUBLICATIONS

Iron Age, "How to Avoid Hot Cracking in Stainless Welds", Robert R. Irving, pp. 60, 61, Feb. 14–21, 1977.

Metals Handbook Ninth Edition, vol. 6, pp. 637–639, "Electron Beam Welding", copyright 1983.

Patent Abstracts of Japan, "Welding Method of Water–Wheel Guide Vane", (JA–58–132378), Nov. 2, 1983.

*Primary Examiner*—Samuel M. Heinrich
*Attorney, Agent, or Firm*—Antonelli, Terry, Stout & Kraus, LLP

[57] ABSTRACT

Method of welding a carbon steel and a austenitic stainless steel involves using high density energy beam like a laser beam or electron beam. Welding using high density energy beam is effective to obtain a high precision welding. For the purpose of obtaining both high precision and no cracks, and no deformation, the method of the invention controls the structure of a weld portion to be a mixed structure of an austenitic structure and not greater than 20 wt % of a ferritic structure.

8 Claims, 4 Drawing Sheets

MOVING DIRECTION OF TABLE

METHOD OF WELDING A CARBON STEEL AND AN AUSTENITIC STAINLESS STEEL TOGETHER AND RESULTANT STRUCTURE

FIELD OF THE INVENTION

This invention relates to a welding method of a carbon steel and an austenitic stainless steel by using a high density energy beam, and a structure produced by the welding method. More particularly, the present invention relates to a welding method of a joint portion of an exterior container for a gas breaker for power transmission/distribution equipment for which high reliability is required, and a gas breaker for power transmission/distribution equipment assembled by the welding method.

BACKGROUND OF THE INVENTION

When a structural container is produced by welding, deformation and a residual stress occur due to a welding heat. For this reason, it is difficult to produce a structural container having high precision. Particularly when a welding heat input is high, its influences become great. Once the container undergoes deformation, machining becomes necessary to correct the shape, and the reduction of deformation has been therefore desired. Arc welding such as carbonic acid gas arc welding or MIG welding has greater welding heat input than high density energy welding such as laser welding or electron beam welding. Accordingly, weld deformation and the residual stress tend to remarkably increase when the welding quantity becomes great. Since the welding speed is low, productivity is low, and large quantities of fumes and spatters are generated. Therefore, an extra process step is necessary for removing them and at the same time, the environment of the work is deteriorated.

The application of the high density energy welding methods such as laser welding and electron beam welding has been vigorously studied.

On the other hand, the high density energy welding method such as laser welding and electron beam welding, can make the heat input smaller than the gas arc welding and MIG welding methods, and the application of this method to welding of different kinds of materials has been studied, too. When the different kinds of materials such as a carbon steel and an austenitic stainless steel are bonded by welding, the weld metal formed at the joint portion has intermediate components between these different kinds of materials. At this time, there is the case where a martensitic structure having lower brittleness or an intermetallic compound is formed due to mixture of components of both materials. Particularly, the weld boundary on the carbon steel side comprises a metallic structure containing the intermetallic compound between carbon and the Cr element and an extremely hard and brittle martensitic structure. Because the martensitic structure is likely to occur at the weld portion of the different kinds of materials, the resulting weld becomes hard, its mechanical properties drop, and various weld defects such as high temperature crack and low temperature crack are likely to occur. According to the welding method involving a large heat input such as the carbonic acid gas arc welding or MIG welding method, the brittle martensitic structure and the intermetallic compound are likely to be formed. To obtain a weld portion having high soundness and reliability, it is essentially necessary to control the composition and structure of the weld metal at the joint portion by, for example, carrying out build-up welding of a suitable welding material on the carbon steel side. When a high density energy welding method having a small heat input quantity such as laser welding or electron beam welding method is used, the welding width becomes small and the depth of penetration becomes great. Because the melt quantity becomes small, it is expected that the absolute formation quantity of the brittle martensite structure and the intermetallic compound can be limited. Accordingly, it is expected that this method can obtain a weld portion having sufficiently high soundness and reliability by adding a small amount of a suitable welding material.

In the case of a vane member and a spindle member of a hydraulic turbine for power generation for which high reliability is a requisite, a 13 Cr stainless steel is used for the vane member which comes into contact with water, and a carbon steel is used for the spindle member to which corrosion resistance can be imparted by a lubricant, etc. Japanese Patent Laid Open No. 132378/1983 discloses a method which uses electron beam welding for welding of this vane member and the spindle member and regulates the composition of the joint portion by interposing an intermediate medium metal of a pure nickel material. According to this method, a weld portion having higher impact toughness than welding without using an addition metal can be obtained.

SUMMARY OF THE INVENTION

When the austenitic stainless steel and the carbon steel are welded by the high density energy beam method by adding the nickel material, however, impurities in the carbon steel such as P, S, etc, diffuse into the weld metal, react with Cr, etc, in the stainless steel and precipitate as an intermetallic compound layer at the crystal grain boundary. If this compound layer exists in the joint portion, very small cracks might occur due to the thermal stress at the time of cooling after welding.

It is an object of the present invention to provide a welding method of a carbon steel and an austenitic stainless steel by using a high density energy beam, which provides a weld portion having high toughness without causing cracks after welding, and a structure assembled by this welding method.

To accomplish the object described above, the present invention provides a method of welding a carbon steel and an austenitic stainless steel, wherein the high density energy beam is used as a heat source of welding described above, and a metallographic structure of the weld portion comprises a mixed structure of an austenitic structure and not greater than 20% of a ferritic structure.

In the method described above, the present invention provides a method of welding a carbon steel and an austenitic stainless steel, wherein the high density energy beam is used as a heat source of welding described above, an austenitic stainless steel welding material is filled and added as a welding material, and a penetration ratio of a base metal into the weld metal at the joint portion is not greater than 80%.

In the method described above, the present invention provides a method of welding a carbon steel and an austenitic stainless steel, wherein the high density energy beam is used as a heat source of welding described above, and an austenitic stainless steel welding material is filled and added.

In the method described above, the present invention provides a method of welding a carbon steel and an austenitic stainless steel, wherein an austenitic stainless steel welding material is filled and added at the time of welding.

In the method described above, welding is controlled so that the width of a weld metal on the surface side of a weld bead is substantially equal to the width of the weld on the Uranami side (i.e. the side opposite to the surface side of the weld bead). This portion of the weld is also known as the penetration bead.

The austenitic stainless steel welding material preferably contains, in terms of a weight percentage, not greater than 0.15% of C, not greater than 0.65% of Si, 1.0 to 3.0% of Mn, 10 to 16% of Ni, 26 to 32% of Cr, with a balance of Fe, and not greater than 0.02% of P and not greater than 0.02% of S as unavoidable impurities.

The welding material more preferably contains, in terms of a weight percentage, not greater than 0.15% of C, 0.65% of Si, 1.0 to 3.0% of Mn, 10 to 16% of Ni, 26 to 32% of Cr, 1.0 to 5.0% of Mo, with a balance of Fe, and not greater than 0.02% of P and not greater than 0.02% of S as unavoidable impurities.

In the method described above, it is preferred that the welding groove is secured on the stainless steel base metal side and root pass or multi-layer welding is carried out by adding the welding wire so that the penetration ratio described above does not exceed 80%.

In multi-layer welding described above, final welding passes of the second layer et seq. is preferably carried out by pierce welding.

In the method described above, welding is preferably carried out by fitting a melt insert containing, in terms of a weight percentage, not greater than 0.15% of C, not greater than 0.65% of Si, 1.0 to 3.0% of Mn, 10 to 16% of Ni, 26 to 32% of Cr, with a balance of Fe, not greater than 0.02% of P and not greater than 0.02% of S as unavoidable impurities, to the weld portion between the carbon steel and the stainless steel.

Also, welding is preferably carried out by jointly using a welding wire containing, in terms of a weight percentage, not greater than 0.15% of C, 0.65% of Si, 1.0 to 3.0% of Mn, 10 to 16% of Ni, 26 to 32% of Cr, with a balance of Fe, and not greater than 0.02% of P and 0.02% of S as unavoidable impurities, at the weld portion between the carbon steel and the stainless steel.

The present invention provides a structure comprising a carbon steel and an austenitic stainless steel, which structure is produced by welding a weld portion between a carbon steel and an austenitic stainless steel by using a high density energy beam as a heat source, and wherein the metallographic structure of the weld portion is a mixed structure of the austenitic structure and not greater than 20% of a ferritic structure.

In a structure comprising a carbon steel and an austenitic stainless steel, the present invention provides a structure comprising the carbon steel and the austenitic stainless steel, wherein the weld portion between the carbon steel and the austenitic stainless steel is produced by welding by using a high density energy beam as a heat source, and a penetration ratio of a base metal into the weld metal at the weld portion is not greater than 80%.

In a structure comprising a carbon steel and an austenitic stainless steel, the present invention provides a structure comprising the carbon steel and the austenitic stainless steel, which is produced by welding a weld portion between the carbon steel and the austenitic stainless steel by using a high density energy beam as a heat source, and wherein the metallographic structure of the weld portion is a mixed structure of the austenitic structure and not greater than 20% of a ferritic structure, and a penetration ratio of a base metal into the weld metal of the weld portion is not greater than 80%.

In a sheath for a gas breaker for a power transmission/distribution equipment or for a gas insulated switching apparatus, equipped with a carbon steel flange and an austenitic stainless steel pipe, the present invention provides a sheath for a gas breaker for power transmission/distribution equipment or for a gas insulated switching apparatus, wherein the joint portion between the flange and the pipe is produced by welding by using a high density energy beam as a heat source, the metallographic structure of the weld portion is a mixed structure of an austenitic structure and not greater than 20% of a ferritic structure, and a penetration ratio of a base metal into the weld metal of the weld portion is not greater than 80%.

In a sheath for a gas breaker for power transmission/distribution equipment or for a gas insulated switching apparatus, equipped with a carbon steel flange and an austenitic steel pipe, the present invention provides a sheath for a gas breaker for power transmission/distribution equipment or for a gas insulated switching apparatus wherein the width of the weld metal at the joint portion between the flange and the pipe on the weld bead surface side is substantially equal to the width of the weld metal on the weld Uranami side, and a reinforcement of weld of the Uranami exists on the same plane as the inner diameter surface of the pipe.

In the sheath for a gas breaker for transmission/distribution equipment or for a gas insulated switching apparatus described above, the present invention provides a sheath for power transmission/distribution equipment or for a gas insulated switching apparatus, wherein a hydraulic pressure is allowed to act inside a container by sealing the flange portion by a thick plate having higher rigidity than the pipe so as to correct deformed portion due to high density energy beam welding, and to remove a residual stress of welding.

The present invention provides a welding material for welding a carbon steel and an austenitic stainless steel by high energy beam welding, wherein the austenitic stainless steel welding material contains, in terms of a weight percentage, not greater than 0.15% of C, not greater than 0.65% of Si, 1.0 to 3.0% of Mn, 10 to 16% of Ni, 26 to 32% of Cr, the balance of Fe, and not greater than 0.02% of P and not greater than 0.02% of S as unavoidable impurities.

The present invention provides further an austenitic stainless steel welding material for welding a carbon steel and an austenitic stainless steel by high energy beam welding, wherein the welding material contains, in terms of a weight percentage, not greater than 0.15% of C, not greater than 0.65% of Si, 1.0 to 3.0% of Mn, 10 to 16% of Ni, 26 to 32% of Cr, 1.0 to 5.0% of Mo, the balance of Fe, and not greater than 0.02% of P and not greater than 0.02% of S as unavoidable impurities.

Figure 1:
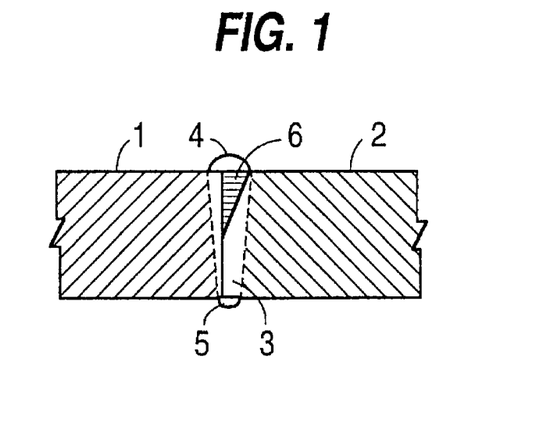
FIG. 1 is a sectional view of a single bevel groove or half V-shaped groove weld portion.

FIG. 1 is a sectional view of a laser weld portion of a weld structural container made of different kinds of materials, i.e. a carbon steel 1 and an austenitic stainless steel 2, according to the present invention. The sheet thickness of a base metal is 9 mm. A single bevel groove having a depth of 4.5 mm and a maximum angle of 45° is employed in the stainless steel 2, and laser welding is carried out by filling and adding a linear welding material.

The composition of the resulting weld metal 3 is a mixed composition of the carbon steel 1, the stainless steel 2, and the added welding material and the feed sectional area of the welding bead material is the sum of a reinforcement of weld 4, a Uranami 5 and the groove portion 6. It will be understood that the sectional area of the welding material equals (wire feeding speed/welding speed)×sectional area of welding wire.

It is known in the past that the strength, toughness and very small fine crack property of the joint portion change in accordance with the components of this weld metal 3.

The inventors of the present invention have examined the most suitable structure and composition of the weld metal when a high density energy beam welding method such as laser and electron beam is used, and have completed the present invention. When the high density energy beam welding method such as laser and electron beam is used, the cooling speed of the weld metal is high; hence, the crystal grains of the weld metal are small. Namely, the crystal grains of the weld metal become smaller than when a low density energy welding method such as arc welding having a great heat input and a low cooling speed is used. In accordance with the present invention, it has been found for the first time that P and S impurities in a welded base metal (particularly in the carbon steel), which do not pose serious problems when the crystal grains are great as with arc welding, precipitate around the austenitic crystal grains in the weld metal at the joint portion and cause weld cracks during the cooling process after welding is completed. Generally, the carbon steel 1 and the austenitic stainless steel 2 as the different kinds of welding materials used in arc welding are JIS D309 and D310 type stainless steels and a high nickel alloy. The present inventors have conducted confirmation tests to confirm whether or not these materials can be used for laser welding. As a result, the present inventors have confirmed that a martensitic structure occurs and low temperature cracks also occur in a broad range of the welding conditions when the D309 and D310 types is used. When a high nickel alloy is used as a welding material, high temperature cracks occurs in a broad range of the welding conditions. When the high density energy beam welding method such as laser and electron beam is used, the inventors have confirmed that the welding material must be selected from a standard different from the selection standard of the welding material used for arc welding.

The structure and composition of the weld metal change in accordance with the following factors or conditions:

(1) composition of each metal to be welded;
(2) composition of a welding material to be added during welding;
(3) heat input condition at the time of welding;
(4) groove shape;
(5) feed speed of welding material.

Accordingly, the conditions (1) to (5) should be determined so that the calculation result of a function using the conditions (1) to (5) described above provides the most desirable strength, toughness and fine crack property in the resulting weld. A high density energy beam welding method using laser, electron beam, etc. is different from a low energy density welding method such as arc welding in the conditions (3), (4) and (5) among the conditions (1) to (5).

Therefore, the condition (2), that is, the composition of the welding material to be added during welding, must be changed, too.

Hereinafter, the reason why the composition of the welding materials to be added during welding as the condition (2) is considered of prime importance in the present invention will be explained. First, assuming that the components of the weld metal 3 are substantially equal to the components of the stainless steel 2, a heterogeneous layer resulting from impurities such as P.S. etc. around the austenitic crystal grains causes very small weld cracks, as described heretofore. For this reason, delta-ferrite particles preferably exist in the weld metal. Because the delta-ferrite particles cause solid solution of P, S, etc, as the impurities and reduce an impurity layer around the austenitic crystal grains. However, when the amount of the delta-ferrite becomes too great, hardness of the weld metal becomes too great and its toughness drops. The weld metal therefore preferably has an austenitic structure containing not greater than 20% of delta-ferrite.

The depth of penetration of the base metal into the weld metal to be welded is preferably as small as possible. Carbon in the carbon steel diffuses into the weld metal during welding. However, if the portions at which the carbon content is small locally occurs in the weld metal, the strength of the material drops. When the depth of penetration is great, deformation of the weld portion after welding becomes great. Accordingly, the penetration ratio of the base metal into the weld metal must be up to not more than 80% and is preferably as close to 0% as possible.

A suitable weld design must be also made in order to control the weld metal structure. In other words, even when the suitable welding materials are used, the weld metal components change in accordance with the mixing ratio of the base metal and the welding materials. Therefore, a suitable groove must be secured at the weld portion and the amounts of addition of the welding materials must be suitably regulated. This regulation can be changed by the shape of the welding materials, too, and this change can be accomplished by using a welding wire, a thin sheet-like welding insert or ribbon, etc. The weld metal components become appropriate only when the suitable welding materials are used and the penetration ratio of the base metal components into the weld metal is preferably less than 80%.

The experiments carried out in accordance with the invention reveal that in order to obtain an austenitic structure wherein the penetration ratio is less than 80% when the carbon steel 1 and the stainless steel 2 are mixed at a mixing ratio of about 1:1 in the weld metal and the structure of the weld metal 3 containing not greater than 20% of ferritic structure, the following ranges must be satisfied as the ranges of the components (given in wt %) of the welding materials:

C≦0.15%, Si≦0.65%, Mn: 1.0 to 3.0%, Ni: 10 to 16%, Cr: 26 to 32%, Fe: balance, as unavoidable impurities: P≦0.02%, S≦0.02%; as other elements: 1.0 to 5.0% of Mo in place of Cr.

The reasons for these chemical compositions are given hereinafter.

(a) Carbon (C) must be added in an amount of about of 0.1% as the austenitic formation element so as to obtain the strength of the steel. However, the steel becomes hard with the increase of the amount of addition of carbon, and carbon combines with other elements and reduce the properties of the steel as well as its weld ability. Particularly because carbon forms an intermetallic compound with chromium (Cr), the amount of addition is limited to not greater than 0.15%.

(b) Silicon (Si) is added as a deoxidizer at the time of welding, and functions as a ferrite formation element. Since the addition of silicon in a great amount invites the drop of ductility and impact characteristics of the steel, its upper value is limited to 0.65%.

(c) Manganese (Mn) plays the role of the deoxidizer in the same way as Si at the time of welding and effectively operates for removing impurities such as P and S. It also functions as an austenitic formation element, and the addition of Mn in a suitable amount improves ductility, but the addition in a great amount deteriorates machinability.

Accordingly, the amount is limited to the range of 1.0 to 3.0%.

(d) Nickel (Ni) is an austenitic formation element and is one of the principal elements of the stainless steel. Ni is suitably added in an amount ranging from 10 to 16%. When the amount is small, the steel becomes hard and when it is great, a crack in the high temperature weld is likely to occur.

(e) Chromium (Cr) functions as a ferrite formation element. Though the amount of addition of Cr is associated with the amounts of addition of Si and Ni, it is suitably from 26 to 32%. When the amount of addition exceeds 30%, Ni is increased by 0.5% per 1% increase of Cr, or Mo is added. The addition of an excessive amount of Cr makes the steel hard and invites the drop of ductility and impact value.

(f) Molybdenum (Mo) functions as a ferrite formation element, and can be added in place of Cr. Since ductility tends to drop when the amount of Cr exceeds 30%, Mo is preferably added within the range of 1.0 to 5.0%.

(g) Phosphorus (p) and sulfur (S) are unavoidable impurity elements and their amount may be reduced as much as permitted by the existing steel making technologies to below 0.02%. The increase of the amounts of these impurities promotes weld high temperature crack.

The elements described above are not only added based on the above proportions, but their amounts should be preferably regulated so that the Ni equivalent is from 15 to 17% and the Cr equivalent is from 28 to 33% in accordance with the formulae given below:

Ni equivalent=Ni %+30×C %+½Mn %

Cr equivalent=Cr %+1.5×Si %+Mo %

In the case of the laser welding materials, they are used in the form of a wire or a melt insert.

A weld structure container of a carbon steel flange of a gas breaker for power transmission/distribution equipment and a sheath container for a gas insulated switching apparatus and a stainless steel pipe is welded by forming a groove and adding suitable welding materials as fillers by a laser welding method. Though this weld structure container does not undergo much deformation in comparison with arc welding, deformation corresponding to a weld quantity naturally occurs. After welding is completed, the flange portion is sealed by a thick plate having higher rigidity than the pipe sheet thickness and an internal pressure is allowed to act on the container so as to correct deformation of the weld angle by plastic deformation of the weld portion of the pipe. This internal pressure is preferably applied step-wise by a hydraulic pressure. By applying this operation, the whole, or a part, of machining can be eliminated and the weld residual stress, too, can be made small or can be removed. Eventually, a weld structure container having high accuracy and high quality even after the use for a long period can be provided.

EXAMPLE 1

Table 1 tabulates examples of the chemical compositions of the steel welding materials according to the present invention. LW-1 represents the sample in which Mo is not added, and LW-2 does the sample in which Mo is added.

TABLE 1

Examples of chemical composition of welding materials of this invention

| kind | C | Si | Mn | P | S | Ni | Cr | Mo | Ni equivalent | wt (%) Cr equivalent |
| --- | --- | --- | --- | --- | --- | --- | --- | --- | --- | --- |
| LW-1 | 0.05 | 0.53 | 1.82 | 0.013 | 0.009 | 13.62 | 29.43 | — | 16.0 | 30.3 |
| LW-2 | 0.06 | 0.48 | 1.62 | 0.015 | 0.007 | 14.81 | 29.41 | 2.51 | 17.4 | 32.6 |

Figure 2:
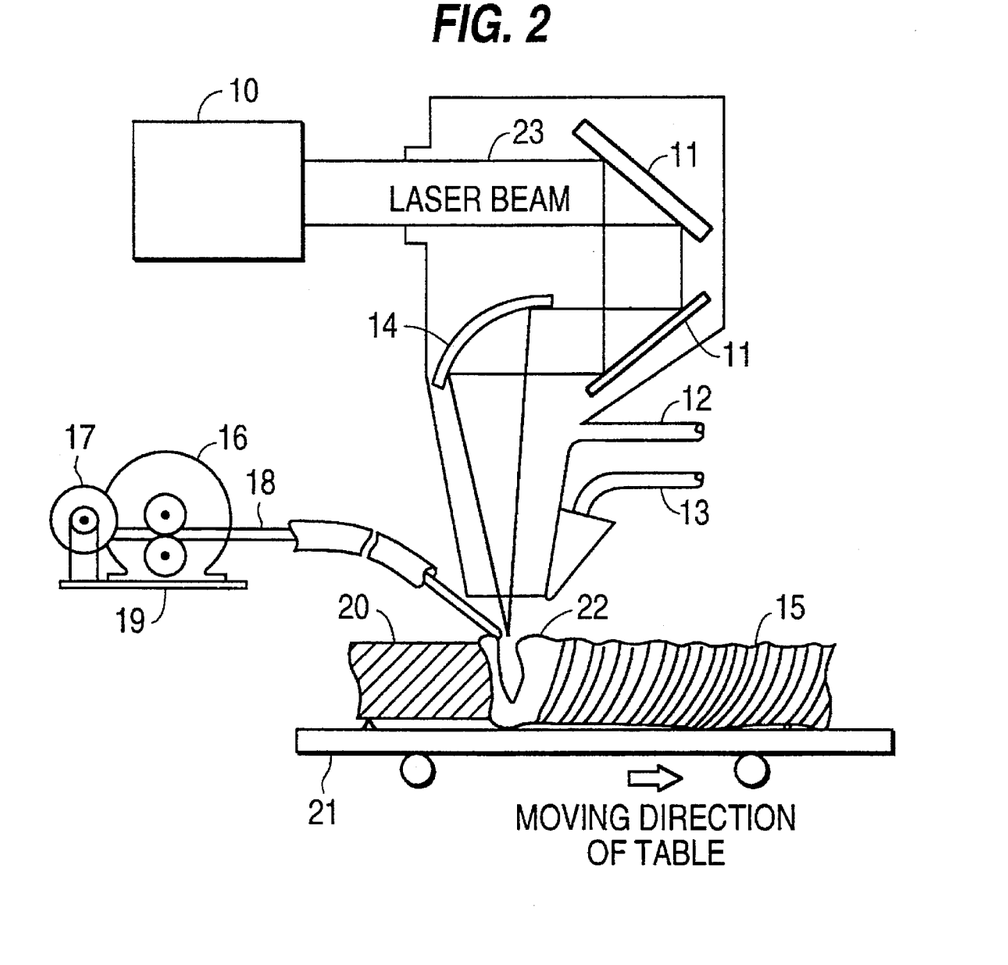
FIG. 2 is a schematic view of a welding machine for conducting the method according to the present invention.

These austenitic stainless steel welding materials were shaped into a wire, and welding experiments were carried out using a carbon steel and an austenitic stainless steel forming a testpiece having a weld groove shown in FIG. 1 and a laser welding machine shown in FIG. 2. In FIG. 2, the direction of a laser beam 23 generated by laser oscillator 10 is changed by using reflecting mirrors. Then the beam is focused by parabolic mirror 14 onto the welding zone or portion. During welding, shield gas like a nitrogen gas or an argon gas is supplied through shield gas nozzle 12, and plasma control gas is supplied through plasma control gas nozzle 13. While welding wire 18 is supplied by welding wire feeder 19 to the welding zone 22. Welding wire feeder comprises a spool for storing the welding wire 18 and a driving motor which delivers the welding wire 18. A base metal assembly 20 to be welded by laser beam 23 is placed on a traveling truck 21, and is moved according to movement of the traveling truck 21. A weld metal 15 is generated after welding zone 22. The groove angle was changed so as to change the base metal penetration ratio of the carbon steel 1 and the austenitic stainless steel 2 into the weld metal.

Figure 3:
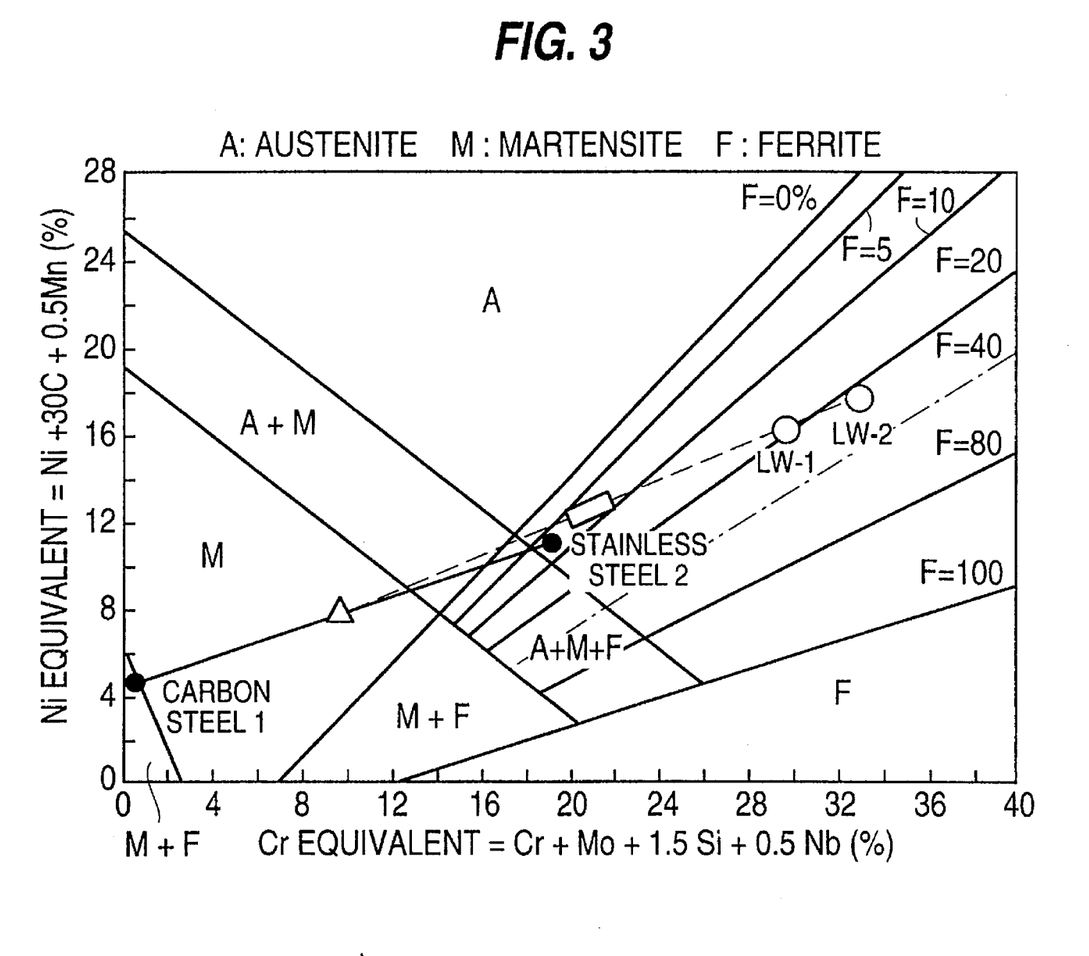
FIG. 3 is a metallographic structure view of a welding material according to the present invention.

FIG. 3 shows the relationship of the carbon steel 1, the austenitic stainless steel 2 and the metallographic structure of the welding materials LW-1 and LW-2 on a Schaeffler's diagram. The structures of the welding materials exist at positions indicated by circles o. and these were identified as austenitic structure having about 20% of ferritic structure. When the carbon steel 1 and the austenitic stainless steel 2 were bonded without using the welding materials of the invention, the mixing ratio of the carbon steel 1 and the austenitic stainless steel 2 was approximately 1:1 in the weld metal structure, and exists at the position indicated by a triangle ▲. It was a martensitic structure. When welding was carried out by using the welding materials LW-1 and LW-2, the structure of the weld metal changed from the martensitic structure indicated by the triangle a to the austenitic structure having about 10% ferritic and indicated by a square ☐ with the decrease of the penetration ratio of the base metal.

Figure 4:
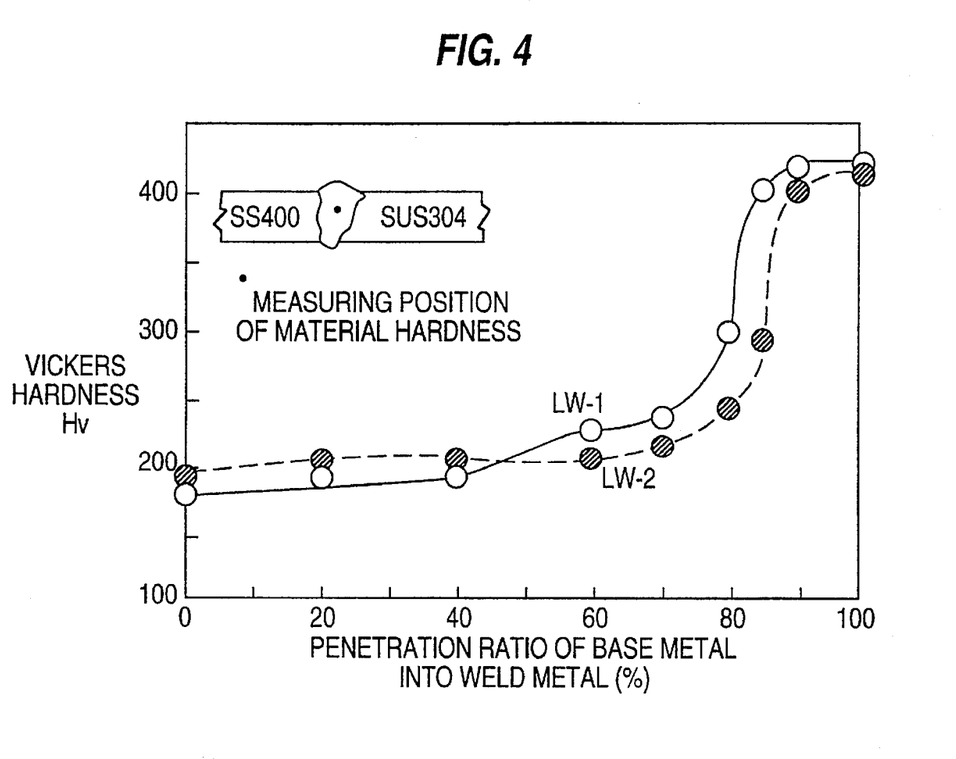
FIG. 4 is a graph showing the relationship between a penetration ratio of a base metal into weld metal for different kinds of base materials according to the present invention and hardness of a weld metal.

FIG. 4 shows the relation between the penetration ratio of the base metal into the weld metal and the Vicker's hardness. Here, the base metal comprises a 1:1 mixture of the carbon steel 1 and the austenitic stainless steel 2. The penetration ratio 0% of the base metal represents the component composition itself of the welding materials. Its hardness Hv was (0.5)=170 to 200 kgf/mm$^2$, and no big difference existed between LW-1 and LW-2. When the LW-1 material was used, the increase of the hardness was observed at the base metal penetration ratio of at least 70%.

In the case of the LW-2 material, a rise of the hardness was observed at the base metal penetration ratio of at least 80%. The range in which the hardness was low was a little bit broader for the LW-2. These experiments revealed that a weld crack is likely to occur when the Vicker's hardness was above 300, and that mechanical properties also decreased. Accordingly, management of the welding work was easier in the case of the LW-2 material. Incidentally, the base metal penetration ratio of 100% represents the martensitic structure where the mixing ratio of the carbon steel 1 and the austenitic stainless steel 2 was 1:1 and the welding materials were not added, as previously described.

Figure 5:
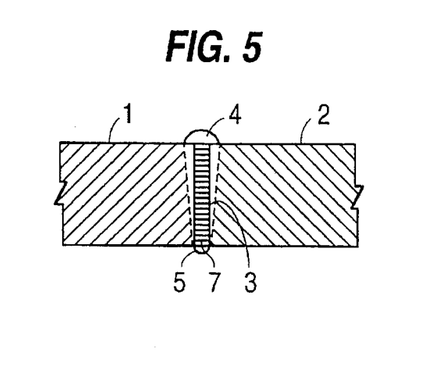
FIG. 5 is a sectional view of a weld portion obtained by fill use of an insert welding material.

FIG. 5 is a schematic cross-sectional view showing the state where a melt insert 7 was inserted as deep as the sheet thickness of the base metals, and welding was conducted. It is a sectional view showing laser welding of the different kinds of materials, i.e. the carbon steel 1 and the stainless steel 2. The sheet thickness of the base metal was 9 mm. The changes of the structure at the upper and lower portions of the weld metal could be reduced by carrying out welding with piercing of the base metals, and weld angular distortion could be also reduced. Further, weld defects such as blowholes could be reduced.

Figure 6:
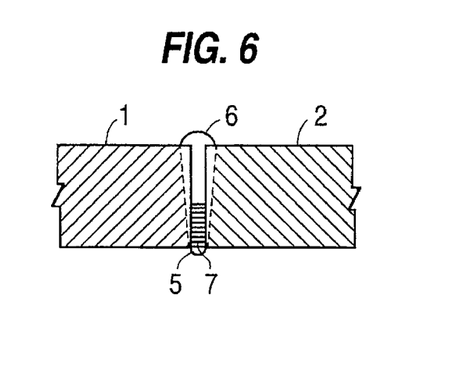
FIG. 6 is a sectional view of a weld portion obtained with a welding insert material and with a welding wire material.

FIG. 6 shows the case where a melt insert 7 having a smaller thickness than the sheet thickness of the base metal was inserted, and a welding wire was filled at the groove portion 6. A wine cup-like melt section could be eliminated by providing this groove, and the weld width at the upper portion of the weld metal could be made substantially equal to the weld width at the lower portion. Incidentally, welding may be made by one pass or multiple passes, but blow-hole defects can be prevented by employing pierce welding in the final pass. Also the weld angular distortion can be reduced.

EXAMPLE 2

Table 2 tabulates the chemical compositions of the carbon steel and the stainless steel pieces forming a weld base metal for joining of flat sheets by welding.

TABLE 2

| | Chemical composition of butt-joint base metal | | | | | | | | | |
|---|---|---|---|---|---|---|---|---|---|---|
| kind | C | Si | Mn | P | S | Ni | Cr | Fe | Ni equivalent | Cr equivalent |
| carbon steel SS400 | 0.18 | 0.12 | 0.38 | 0.019 | 0.011 | — | — | balance | 5.59 | 0.18 |
| stainless steel SUS304 | 0.04 | 0.46 | 0.82 | 0.021 | 0.003 | 8.47 | 18.30 | balance | 10.08 | 18.99 |

The sheet thickness of each of the carbon steel 1 and the austenitic stainless steel 2 of the base metal was 9 mm, the sheet width was 130 mm, and the welding length was 400 mm. The weld groove was 45°, with a single bevel groove as shown in FIG. 1, and the root face was 4.5 mm. A welding wire of the LW-2 material of the composition shown in Table 1 having a diameter of 0.6 mm was used as the welding material. Table 3 tabulates the conditions of the carbonic acid gas laser (hereinafter called simply the "laser") used for welding.

Welding was completed in two passes, and the final welding pass of the two passes was by pierce welding. The base metal penetration ratio Wd could be calculated by 1—(S/Ws) from the sectional area S of the welding material and the sectional area Ws of the weld metal, and Wd in Table 3 was 79.1%.

the weld residual stress was found to be 450 MPa in the direction of the welding line and 290 MPa in the direction orthogonal to the welding line (pipe axial direction). It could be confirmed that the LW-2 material according to the present invention was suitable as a laser welding material.

EXAMPLE 3

When conducting the joint welding of the flat sheets of different kinds of materials having the base metal compositions shown in Table 2 in the same way as in Example 2, a sheet-like melt insert 7 having a sheet width of 1.0 mm was added to the weld groove as shown in FIG. 5. The melt insert had the same composition as that of the LW-1 material shown in Table 1. Welding was carried out under the laser welding condition of an output of 10 kw and a welding speed of 8 mm/sec. The sectional area S of the melt insert 7 was

TABLE 3

| | Laser welding condition | | | | | |
|---|---|---|---|---|---|---|
| welding pass (n) | Laser Power (kw) | welding speed (mm/s) | focal point (mm) | sectional area of welding material S(mm²) | sectional area of weld metal Ws(mm²) | base metal penetration ratio wd(%) |
| 1 | 6 | 10 | ±0 | 4.7 | 22.5 | 79.1 |
| 2 | 10 | 10 | ±0 | | | |

Table 4 tabulates the results of characteristic tests conducted for the laser weld joint under the welding conditions tabulated in Table 3.

9 mm2 and that of the weld metal (Ws) was 24.5 mm². The base metal penetration ratio Wd was 62.5%. The joint characteristics of this weld portion were equivalent to those

TABLE 4

| | Characteristic test result of laser weld joint | | | | | |
|---|---|---|---|---|---|---|
| joint tensile strength (MPa) | elongation (%) | break position | weld metal impact value vE$_o$ (J/cm²) | weld metal hardness (Hv) | 180° bending | weld metallographic structure |
| 425–442 | 18.5–23.5 | carbon steel base metal | 92–135 | 175–185 | good | A + F |

A: austenite
F: ferrite

The tensile strength of the joint was substantially equal to that of the carbon steel, and the impact value of the weld metal was excellent and equal to that of the austenitic stainless steel. As a result of measurement by a strain gauge, tabulated in Table 4, and the same result as Example 2 could be obtained. In other words, the weld portion having excellent characteristics could be obtained by using the welding materials of the present invention within a relatively broad welding range.

EXAMPLE 4

Joint welding of the flat sheets of different kinds of materials having the base metal composition shown in Table 2 was carried out in the same way as in Example 2. Welding was made by adding a sheet-like melt insert having a sheet width of 1.0 mm to the welding groove as shown in FIG. 6. The melt insert had a thickness about ½ of the sheet thickness of the base metal, and the upper portion was to be filled with the welding wire. The melt inert 7 had the same composition as that of the LW-1 material shown in Table 1. After welding in one pass was conducted, the welding wire having a diameter of 0.8 mm, which was the LW-2 material of Table 1, was used for welding in two passes. Laser welding was conducted under the condition shown in Table 3. The sectional area S of the welding material was 12 mm$^2$ and the sectional area Ws of the weld metal was 27.4 mm$^2$. The base metal penetration ratio Wd was 56.2%. The joint characteristics of this weld portion were equivalent to that of Table 4, and the same result of those of Examples 2 and 3 could be obtained.

EXAMPLE 5

Figure 7:
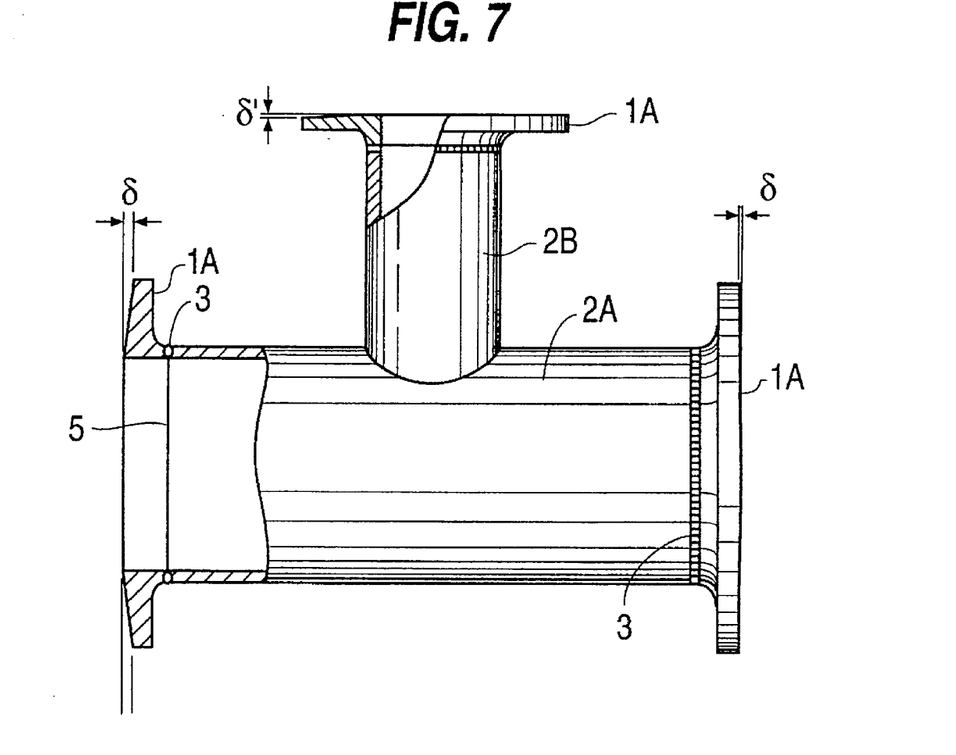
FIG. 7 shows a container model of a gas insulated switching apparatus.

An embodiment of a large-scale metallic container model for power equipment will be explained. FIG. 7 shows a container model of a gas insulated switching apparatus. A pipe 2 of the austenitic stainless steel 2 was made of a SUS304 material having an inner diameter of 560 mm and a sheet thickness of 9 mm, and provided a breaker container. It was welded by laser welding to an SS400 carbon steel flange 1A having an outer diameter of 650 mm and a sheet thickness of 25 mm. The container was connected to other appliance by bolts. An SF$_6$ gas having a pressure of not higher than 0.59 MPa (6 kgs/cm$^2$) was sealed into the container. Accordingly, the container must be kept air-tight. In other words, the weld portion must be sound. At the same time, the carbon steel flange 1A must have a plane orthogonal to the axis and flatness so that mutual adhesion and hence, sealability, can be secured through O-rings with the other appliance. In other words, it is preferred that the deformation quantities δ,δ of the inner and outer diameter portions inside the flange surface such as the carbon steel flange 1A are substantially zero as shown in the drawing.

Figure 8:
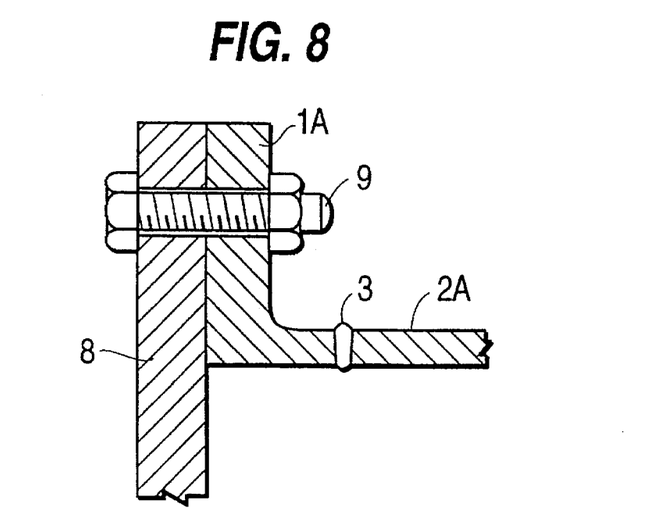
FIG. 8 is a sectional view of a weld portion of a metal container according to an embodiment of the present invention.

FIG. 8 is a sectional view of the container and the flange weld portion shown in FIG. 7. The chemical compositions of carbon steel and the stainless steel forming the weld base metal are substantially the same as those given in Table 2. A seal plate 8 for preventing weld deformation and for allowing the hydraulic pressure to act so as to correct deformation after welding was fitted to the carbon steel flange 1A by a bolt-nut 9. The welding groove was a 45° single bevel shaped groove and was similar to the groove shown in FIG. 1, and a root face was 4.5 mm. A welding wire made of the LW-Z material shown in Table 1 and having a diameter of 0.8 mm was used as the welding material. Table 5 tabulates the laser welding conditions.

TABLE 5

| welding pass (n) | Laser welding condition | | |
|---|---|---|---|
| | output (kw) | welding speed (mm/s) | focal point (mm) |
| 1 | 6 | 10 | ±0 |
| 2 | 10 | 6.7 | ±0 |

Welding was completed in two passes, and the final welding pass of the two passes was by pierce welding. As a result of a dyeing permeation test after welding, weld defects such as cracks were not found, and the weld satisfied the weld judgement standard of a JIS 2 class by an X-ray permeation test. Weld deformation was measured by removing the seal plate 8, and the deformation quantity 6 of the inner and outer diameter portions inside the flange plane, that is, the gap between the carbon steel flange 1A and the outer diameter portion of the seal plate 8, was from 0.24 to 0.50 mm. After weld deformation was measured, the seal plate 8 was again fitted, and the hydraulic pressure was increased step-wise inside the container and was kept at 1.764 MPa (18 kgf/cm$^2$) for 1,800 seconds (30 minutes). After removal of the load, the deformation quantity of the gap between the carbon steel flange 1A and the outer diameter portion of the seal plate 8 was measured. As a result, it was found that deformation was substantially corrected. The gap between the carbon steel flange 1A and the seal plate 8 was not greater than 0.1 mm as a mean value. The residual stress of the weld portion after the application of the hydraulic pressure was measured by using a strain gauge, and was found to be 83.3 MPa in the direction of the weld line (pipe peripheral direction) and 52.8 MPa in the direction orthogonal to the weld line (pipe axial direction). The residual stress decreased, too. Incidentally, since the shape of Uranami became small in laser welding, the effective inner diameter of the weld structure container became great.

EXAMPLE 6

An embodiment of a metallic vacuum container model for metal machining will be explained. The embodiment is similar to the one shown in FIG. 7. The sectional view of the metallic flange weld portion is similar to the one shown in FIG. 8. The present invention was applied to welding between a SUS304 stainless steel 2 pipe having an inner diameter of 600 mm and a thickness of 9 mm and a SS 400 carbon steel flange 1A having an outer diameter of 660 mm and a thickness of 25 mm. The chemical compositions of the carbon steel and stainless steel forming the welding base metal are substantially equal to the chemical composition shown in Table 2. A similar seal plate 8 to the plate shown in Example 5 was fitted to the carbon steel flange 1A. A melt insert 7 having a sheet width of 1.0 mm was used for the welding groove as shown in FIG. 3. The composition of the melt insert was the same as that of the LW-1 material shown in Table 1. The laser welding condition was an output of 10 kw, a welding speed of 8 mm/sec and a focal point of ±0 mm. Welding was by pierce welding which was finished in one pass. Weld defects such as cracks were not observed by the dyeing penetration test after welding, and the weld satisfied the weld judgement standard of the JIS 2 class by an X-ray transmission test. Further, weld deformation was measured by removing the seal plate 8. The gap between the carbon steel flange 1A and the outer diameter portion of the seal plate 8 was 0.15 to 0.65 mm. After the measurement of weld deformation, a hydraulic pressure of 1.176 MPa (12 kgf/cm$^2$) was allowed to act on the inside of the container, and the container was kept under this state for 1,800 seconds (30 minutes). After removal of the load, the deformation quantity was measured, and as a result, deformation was substantially corrected, and was below 0.2 mm as a mean value.

EXAMPLE 7

An embodiment of a sheath container model of a gas insulated switching apparatus for power equipment will be explained. This embodiment is similar to the one shown in FIG. 7. The sectional view of a container flange weld portion is similar to FIG. 8. This embodiment is applied to welding of a stainless steel pipe 2 having an inner diameter of 1,600 mm and a sheet thickness of 9 mm and a carbon steel flange 1A having an outer diameter of 1,660 mm and a sheet thickness of 25 mm. The chemical compositions of the two weld base metals are substantially equal to the chemical compositions shown in Table 2. A sheet-like melt insert 7 having a sheet width of 1.0 mm was used for the welding groove as shown in FIG. 4. The melt insert had a thickness of about ½ of the thickness of the base metal, and the upper portion of the groove was filled with a welding wire material. The composition of an insert material was the LW-1 material shown in Table 1. After welding in one pass, two-pass welding was carried out by using a welding wire of the LW-2 material of Table 1 having a diameter of 0.8 mm. The laser welding conditions were those shown in Table 3. Welding was completed in 2 passes, and the final welding pass of the two passes was by pierce welding. Weld defects such as cracks were not observed in the dyeing permeation test after welding, and the weld satisfied the weld judgement standard of the JIS 2 class by an X-ray transmission test. Welding deformation was measured. The gap between the carbon steel flange 1A and the outer diameter portion of the seal plate 8 was 0.25 to 0.75 mm. After welding deformation was measured, a hydraulic pressure of 0.882 MPa (9 kgf/cm2) was allowed to act inside the container and was held for 1,800 seconds (30 min.). After the load was removed, the deformation quantity was measured. As a result, deformation was found to be substantially corrected. It was below 0.15 mm in terms of the mean value.

The present invention can provide a welding method using a high density energy beam between carbon steel and a stainless steel, which does not generate cracks at the time of welding but provides a weld portion having high toughness, and a structure assembled by this welding method. Accordingly, the structure keeps high reliability for a long time. When the present invention is applied particularly to a sheath of a gas breaker for power transmission/distribution equipment, high quality power transmission/distribution equipment can be built.

It will appreciated that the carbon steel to be welded as a base metal by the present invention includes C-Mn steel and low alloy steel and preferably has Cr equivalent that is less than 5% and a Ni equivalent that is less than 8%. The austenitic stainless steel to be used as a base metal preferably has a Cr equivalent of 17 to 25% and a Ni equivalent of 8 to 20%.

Also in final welding pass it is preferable to make one pass welding with full penetration. Heat input amount Q is 0.5 to 1.5 kw/mm, preferably 0.9 to 1 kw/mm. Also it will be recognized that feeding speed of the filler material is variable according to sectional area of filler metal and welding speed. With respect to the data in Table 3 a feeding speed at range of between 3.5 m/min. to 5.0 m/min. was evaluated and a feeding speed of 4.0 m/min. was determined to provide optimum results.

Moreover, mixing ratio of the base metals is controlled by adjusting focusing point of the high density energy beam. When the beam is focused at the center line between the base metals, a mixing ratio of about 1:1 is achieved.

Also in addition to the single bevel groove shown in FIG. 1, a single J groove may be used; however the single bevel groove with 45° bevel angle is preferred.

Also, from the foregoing description, it will be understood that in the method of welding, information on the composition of each metal to be welded, information on the composition of a welding material to be added during welding, information on a heat input condition at the time of welding, information on a welding groove shape, and information on feed speed of the welding material are determined in advance and a welding condition for welding the base metals by using the high density energy beam is determined based on the relation between the informations and the strength, toughness and very small crack property on the basis of at least one of these informations.

What is claimed:

1. A method of welding a base metal comprising a carbon steel to a base metal comprising an austenitic stainless steel by using a high density energy beam, which comprises employing a welding material comprising an austenitic stainless steel to provide a weld wherein at least a part of the metallographic structure of a weld portion is a mixed structure comprising an austenitic structure and not greater than 20% by weight of a ferritic structure.

2. A method of welding a carbon steel and an austenitic stainless steel by using a high density energy beam according to claim 1, wherein a penetration ratio of a base metal into the weld portion is not greater than 80%.

3. A method of welding a carbon steel and an austenitic stainless steel by using a high density energy beam according to claim 1, wherein at least a width of a weld portion on a weld bead surface is substantially equal to a width of a weld portion on a back weld surface.

4. A method of welding a carbon steel and an austenitic stainless steel by using a high density energy beam according to claim 2, wherein said welding material contains, in terms of a weight percentage, not greater than 0.15% of C, not greater than 0.65% of Si, 1.0 to 3.0% of Mn, 10 to 16% of Ni, 26 to 32% of Cr, and 1.0 to 5.0% of Mo as an optional component, the balance of Fe, and not greater than 0.02% of P and not greater than 0.02% of S as unavoidable impurities.

5. A method of welding a carbon steel and an austenitic stainless steel by using a high density energy beam according to claim 4, wherein said weld material is at least a form selected from an insert ring and welding wire.

6. A method of welding a carbon steel and an austenitic stainless steel by using a high density energy beam according to claim 1, wherein the weld portion is formed by providing a welding groove on said austenitic stainless steel base metal side and root pass or multi-layer welding is carried out by filling and adding a welding wire of said welding material.

7. A method of welding a carbon steel and an austenitic stainless steel by using a high density energy beam according to claim 6, wherein a final welding pass in said multi-layer welding is by pierce welding.

8. A method of manufacturing a sheath for a gas breaker for power transmission/distribution equipment or for a gas insulated switching apparatus using the method of claim 1 further comprising:

(a) providing weld between a flange sealed by a thick plate having higher rigidity than a pipe, and (b) providing an internal pressure to act on the inside of a container including said flange so as to correct portions of the flange undergoing deformation.

* * * * *